US012326019B2

(12) United States Patent
Kuniyil et al.

(10) Patent No.: US 12,326,019 B2
(45) Date of Patent: Jun. 10, 2025

(54) DOOR HANDLE ASSEMBLY

(71) Applicant: Illinois Tool Works Inc., Glenview, IL (US)

(72) Inventors: Nidhin Kuniyil, Maharashtra (IN); Virupaxi Payannavar, Maharashtra (IN); Ravindra Desai, Maharashtra (IN); Amit Namannavar, Maharashtra (IN)

(73) Assignee: Illinois Tool Works Inc., Glenview, IL (US)

( * ) Notice: Subject to any disclaimer, the term of this patent is extended or adjusted under 35 U.S.C. 154(b) by 192 days.

(21) Appl. No.: 17/977,303

(22) Filed: Oct. 31, 2022

(65) Prior Publication Data

US 2023/0133814 A1 May 4, 2023

(30) Foreign Application Priority Data

Nov. 1, 2021 (IN) ............................ 202121050160

(51) Int. Cl.
*E05B 85/10* (2014.01)
*E05B 85/14* (2014.01)

(52) U.S. Cl.
CPC .......... *E05B 85/103* (2013.01); *E05B 85/107* (2013.01); *E05B 85/14* (2013.01)

(58) Field of Classification Search
CPC ...... E05C 19/02; E05C 19/022; Y10S 292/04; E05B 85/103; E05B 85/107; E05B 85/14
See application file for complete search history.

(56) References Cited

U.S. PATENT DOCUMENTS

| | | | | |
|---|---|---|---|---|
| 11,002,044 | B2 * | 5/2021 | Och | E05B 85/103 |
| 11,739,572 | B2 | 8/2023 | Kuniyil | |
| 2016/0290018 | A1 * | 10/2016 | Hamacher | E05B 85/103 |
| 2017/0159333 | A1 | 6/2017 | Beck | |
| 2019/0283555 | A1 * | 9/2019 | Couto Maquieira | E05B 85/107 |
| 2020/0190848 | A1 * | 6/2020 | Murata | E05B 83/36 |
| 2020/0199918 | A1 * | 6/2020 | Couto Maquieira | E05B 81/90 |
| 2020/0354996 | A1 | 11/2020 | Bresser | |
| 2023/0133814 | A1 | 5/2023 | Kuniyil | |

FOREIGN PATENT DOCUMENTS

| | | | | |
|---|---|---|---|---|
| CN | 112746784 A * | 5/2021 | E05B 79/06 |
| CN | 111101786 B | 1/2024 | |
| WO | WO-2019002472 A1 * | 1/2019 | E05B 81/90 |
| WO | WO-2020048858 A1 * | 3/2020 | E05B 81/90 |

* cited by examiner

*Primary Examiner* — Kristina R Fulton
*Assistant Examiner* — Emily G. Brown
(74) *Attorney, Agent, or Firm* — McAndrews, Held & Malloy, Ltd.

(57) ABSTRACT

Examples of a door handle assembly are disclosed. The door handle assembly has a frame, a handle, a push-push assembly, and a bell crank. The frame has a housing portion and a cavity and is mountable to a door. The handle is disposed in the cavity and pivotably coupled to the frame. The push-push assembly is positioned with a longitudinal axis thereof substantially orthogonal to the handle. The bell crank is pivotably mounted to the frame and operably coupled to the handle and also in cooperative coupling with the push-push assembly. The bell crank has a primary profile having a slanted shape engaged with the push-push assembly to move the push-push assembly between discharged and recharged conditions.

14 Claims, 6 Drawing Sheets

DOOR HANDLE ASSEMBLY

FIELD OF THE DISCLOSURE

This disclosure is directed generally to door handles and, more particularly, to door handle assemblies.

BACKGROUND

A door handle assembly is, generally, used in vehicles to secure or lock a door of the vehicle. For aesthetic appeal of exteriors and interiors, nowadays, vehicles are provided with flush door handle assemblies. Such a door handle assembly includes a handle that is retractably mounted to the vehicle door such that the handle is flush with a lateral wall of the vehicle door, for example, either on an external surface of the vehicle door or facing a passenger compartment of the vehicle, when not in use or undeployed. The handle may be movable between an undeployed or flush position and a deployed position. In the deployed position, the handle protrudes from the vehicle door for being pulled by a user for unlatching the vehicle door. In other words, the handle is cooperatively coupled to a latching mechanism of the vehicle door to unlatch it when the user further pulls the handle from the deployed position.

SUMMARY

Door handle assemblies are disclosed, substantially as illustrated by and described in connection with at least one of the figures, as set forth more completely in the claims.

BRIEF DESCRIPTION OF DRAWINGS

The detailed description is provided with reference to the accompanying figures. It should be noted that the description and the figures are merely examples of the present subject matter and are not meant to represent the subject matter itself.

Figure 1A:
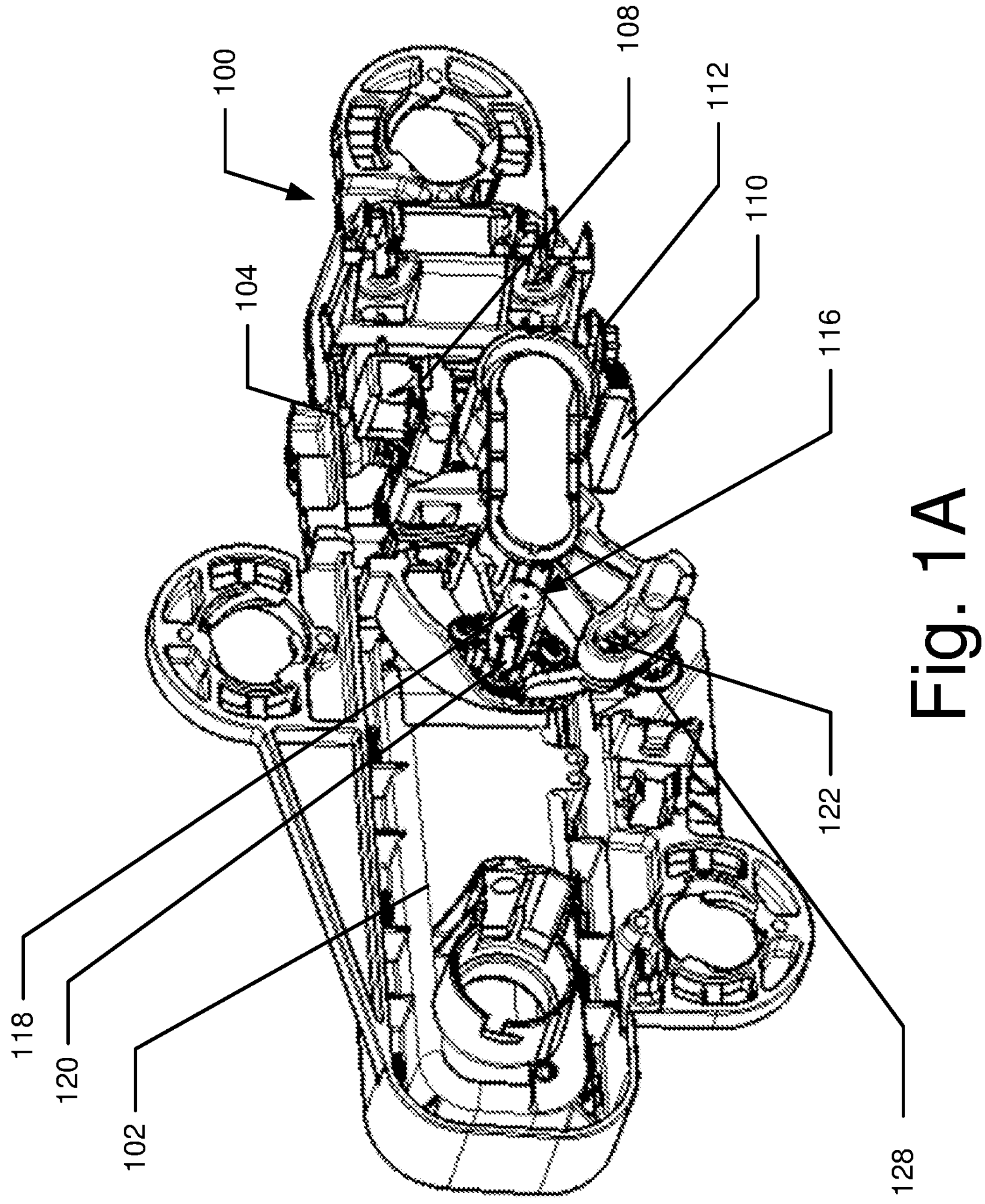
FIG. 1A illustrates a rear perspective view of the door handle assembly, according to an example implementation of the present subject matter.

Throughout the drawings, identical reference numbers designate similar elements, but may not designate identical elements. The figures are not necessarily to scale, and the size of some parts may be exaggerated to illustrate the example shown with better clarity. Moreover, the drawings provide examples and/or implementations consistent with the description; however, the description is not limited to the examples and/or implementations provided in the drawings.

DETAILED DESCRIPTION

Conventional flush door handle assemblies that are deployed in vehicle doors may be mechanically or electrically actuated for moving a handle from a flush position to a deployed position, i.e., from a position in which the handle is aligned with an exterior surface of a vehicle door to a position in which the handle protrudes from the exterior surface of the vehicle door, and vice-versa. Further, the handle may be coupled to a locking component and a latching component that facilitates in unlocking and unlatching a vehicle door, respectively, for opening the vehicle door.

The electric motor as deployed in the vehicle door may be cost inefficient, in terms of the cost of the component as well as the cost of sub-components used for its operations, such as a controller and a protection aid. At the same time, use of an electric motor for movement of the handle may involve a complex assembly of various parts which can acquire space and can further add to the cost. In addition, having a separate locking component and latching component may bring in redundancy of components in the vehicle door as well as add to the cost while increasing the weight of the door. Thus, electric motor operated flush handles may turn out to be costly as components, as well as in terms of ownership from a user's point of view. In addition, upon failure of the electrical motor, the handle may not be movable to the deployed position and, thus, a user may face difficulties in opening the vehicle door. Moreover, housing the electric motor with a lock assembly in the door, of the vehicle, may add on to a weight of the door, and accordingly, to that of the vehicle.

Mechanically actuated door handle assemblies may find use in lieu of electrically actuated door handle assemblies, but with their own share of issues. In conventional mechanically actuated door handle assemblies, a push-push assembly may be employed for moving the handle from the flush position to the deployed position and vice-versa. The push-push assembly is positioned substantially parallel to the surface of the door as well as to the handle when the handle is in flush position. An actuator is coupled with the push-push assembly that cooperates with the handle as well as the push-push assembly. Upon actuation of the handle by an operator, the actuator can, in response, actuate the push-push assembly. However, the push-push assembly employed in the conventional door handle assemblies generally have multiple components and involve a complex assemblage of various mechanical components cooperating with each other. In addition, the push-push assembly is also relatively large-sized in comparison to the overall size of the door handle assembly. Such door handle assemblies, therefore, require a considerable space to be accommodated and may not be employable in vehicles having space constraints. At the same time, the complexity of the assembly not only makes the manufacturing cumbersome but can also be prone to high degree of wear and tear, thereby, requiring frequent servicing, repair, or replacement of the parts. Therefore, the conventional mechanically actuated door handle assemblies may not be an adequate replacement for electrically actuated door handle assemblies.

Examples of the present subject matter relating to a door handle assembly that inter alia address the abovementioned issues are described herein. The door handle assembly includes a handle movable between the flush or undeployed position to the deployed position by means of mechanical linkages, i.e., using a simplified mechanical assembly instead of utilizing an electric motor. To move the handle from the flush position to the deployed position, the handle is mechanically actuated, such as by pressing the handle or by giving a push to the handle. Thereafter, to move the handle back in the flush position, another actuation, such as a manual pull may be provided. The simplified mechanical assembly provides an adequately operative yet cost-effective door handle assembly.

The door handle assembly has a frame for mounting the door handle assembly to the door. The frame may include a housing portion and an exterior surface having a cavity. A handle is disposed in the cavity is pivoted to the frame and is movable between the undeployed position and the deployed position. For example, in the undeployed position, the handle remains inside the cavity and is flush with the exterior surface of the door and, in the deployed position, the handle protrudes from the cavity and beyond the exterior surface of the door.

The door handle assembly further includes a push-push assembly operably coupled to the handle. The push-push assembly may be fixedly attached to the frame of the door handle assembly using fasteners, such as a screw. The push-push assembly includes a body, a compression spring housed inside the body, and a pusher operably coupled to the compression spring. The pusher is adapted to translate along a longitudinal axis of the push-push assembly. The longitudinal axis of the push-push assembly can be along a longest dimension of the push-push assembly.

According to an aspect of the present subject matter, the push-push assembly is positioned substantially orthogonal to the handle, i.e., the longitudinal axis of the push-push assembly is substantially orthogonal to the longitudinal direction or length of the handle. The longitudinal axis of the push-push assembly can be the axis, as mentioned above, along which the pusher is adapted to translate. Due to the orthogonal positioning of the push-push assembly with respect to the handle, flushness of the handle with respect to the frame of the door handle assembly is directly controlled by the push-push assembly. For instance, the handle is in the flush or undeployed position when the push-push assembly is in a recharged condition, i.e., when the compression spring is in a compressed state, and the handle is in the deployed position when the push-push assembly is in a discharged condition, i.e., the compression spring is in a decompressed state.

The door handle assembly also includes a bell crank pivotably mounted to the frame. The bell crank is operably coupled to the handle and the is also in a cooperative coupling with the push-push assembly. The bell crank is a single-piece component and includes a primary profile having a shape that assists in moving the push-push assembly between the discharged and recharged condition. In an example, the pusher of the push-push assembly engages with the primary profile on the bell crank to recharge the push-push assembly. The primary profile formed on the bell crank may have a slanted shape. Further, the primary profile is designed such that maximum height of the primary profile is equal to the distance between a first extreme position of the pusher and a second extreme position of the pusher. The maximum height of the primary profile may be measured from a base of the primary profile of the bell crank to a top end of the primary profile of the bell crank.

Initially, the door may be in a locked condition and can be unlocked using any of the known methods, for example, using a remote keyless system or a mechanical key. When the door is unlocked, the handle is in the flush position and the pusher of the push-push assembly is positioned at an intermediate or home position between the discharged and the recharged position. In addition, the compression spring of the push-push assembly is in the compressed state when the door is unlocked. Further, an operator may provide a push to the handle to activate the handle. In other words, the operator may press the handle to activate it.

When the handle is pressed, the pusher first translates in a direction towards the frame of the door handle assembly, and then after reaching the first extreme position or the recharged position, the pusher translates in a direction away from the frame of the door handle assembly to the second extreme position or the discharged position. In other words, when the pusher translates to the first extreme position from the home position, the compression spring of the push-push assembly is further compressed which, when released, causes the pusher to translate from the first extreme position to the second extreme position decompressing the compression spring in the process. At the second extreme position, the pusher rests at the surface of the bell crank. In addition, the pusher is positioned at one end of the primary profile formed on the bell crank.

In order to unlatch the door, the operator needs to further actuate the handle to move the handle from the flush or undeployed position to the unlatched position. When the handle is moved from the flush position to the unlatched position, the handle forces the bell crank to rotate. When the bell crank rotates, the pusher undergoes relative motion with respect to the primary profile of the bell crank and moves from one end of the primary profile to another end. As a result of the relative motion between the pusher and profile, the pusher translates from the second extreme position to the first extreme position since the primary profile has a slanted shape. Accordingly, when the pusher moves from the second extreme position to the first extreme position, the compression spring moves to compressed state from decompressed state and the push-push assembly moves from the discharged condition to the charged condition.

Further, when the door is unlatched, the handle is released such that the handle does not exert any force on the bell crank. In absence of any external force, the bell crank rotates in opposite direction, such that the pusher gets disengaged with the primary profile. When the pusher is disengaged with the primary profile, the pusher moves from the first extreme position to the home position. Accordingly, the handle moves back to the flush position.

Therefore, a separate actuator is not required to actuate or recharge the push-push assembly when the push-push assembly is in the discharged condition. Further, since the push-push assembly can control the flushness of the handle with respect to the frame of the door handle assembly, a separate actuator is not necessary. Further, the push-push assembly of the present subject matter has a simple design and requires significantly less space. Therefore, the door handle assembly can also be used in vehicle having space constraint. Further, the overall cost and weight of the door handle assembly is significantly low due to small size of the push-push assembly and lesser number of components required to operate the door handle assembly.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

Figure 1B:
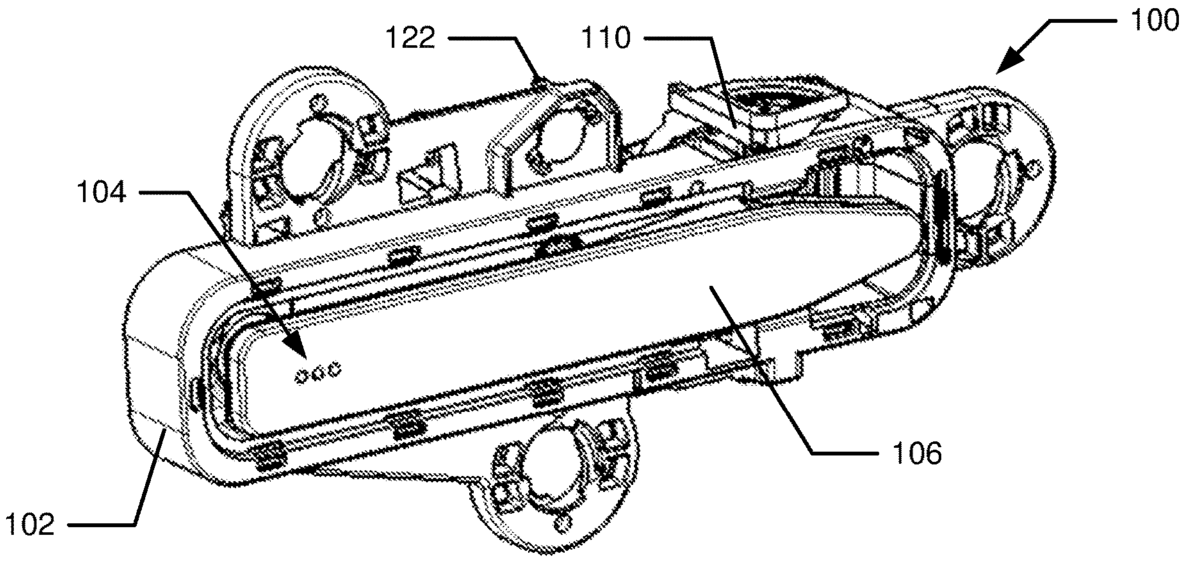
FIG. 1B illustrates a front perspective view of the door handle assembly, according to an example implementation of the present subject matter.
Figure 1C:
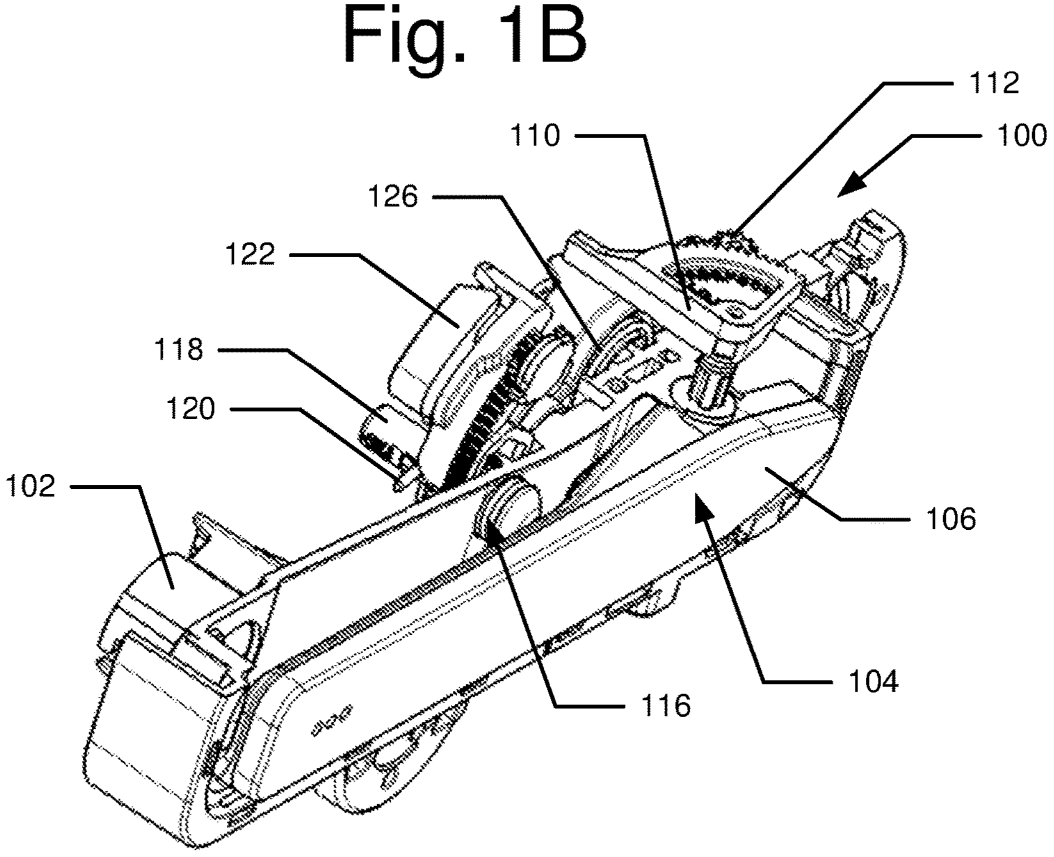
FIG. 1C illustrates a cut-out perspective view of the door handle assembly in which a housing of the door handle assembly is partially removed, according to example implementations of the present subject matter.
Figure 1D:
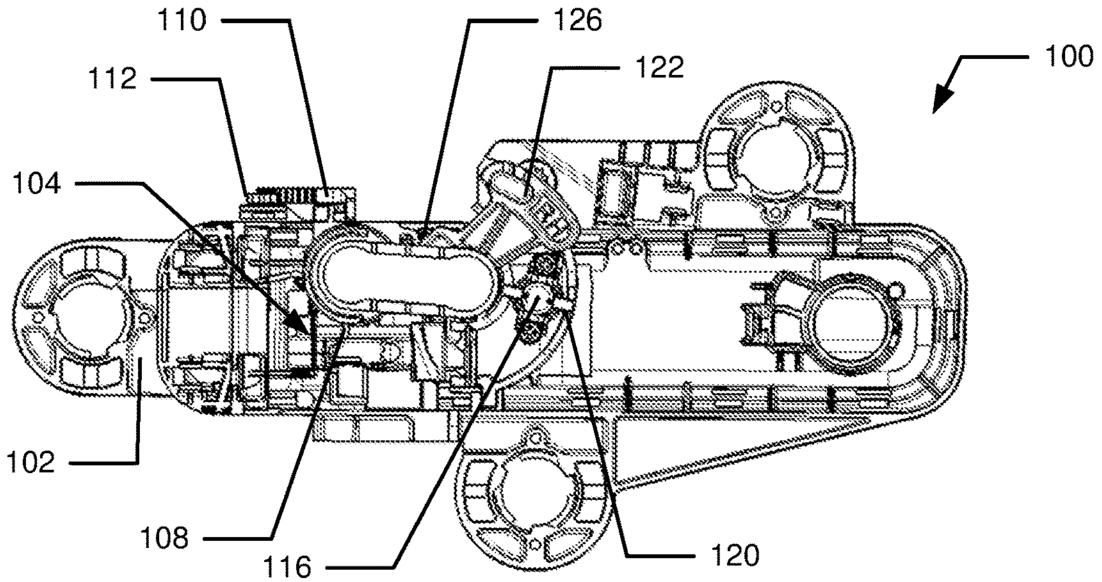
FIG. 1D illustrates a rear view of the door handle assembly, according to example implementations of the present subject matter.
Figure 2:
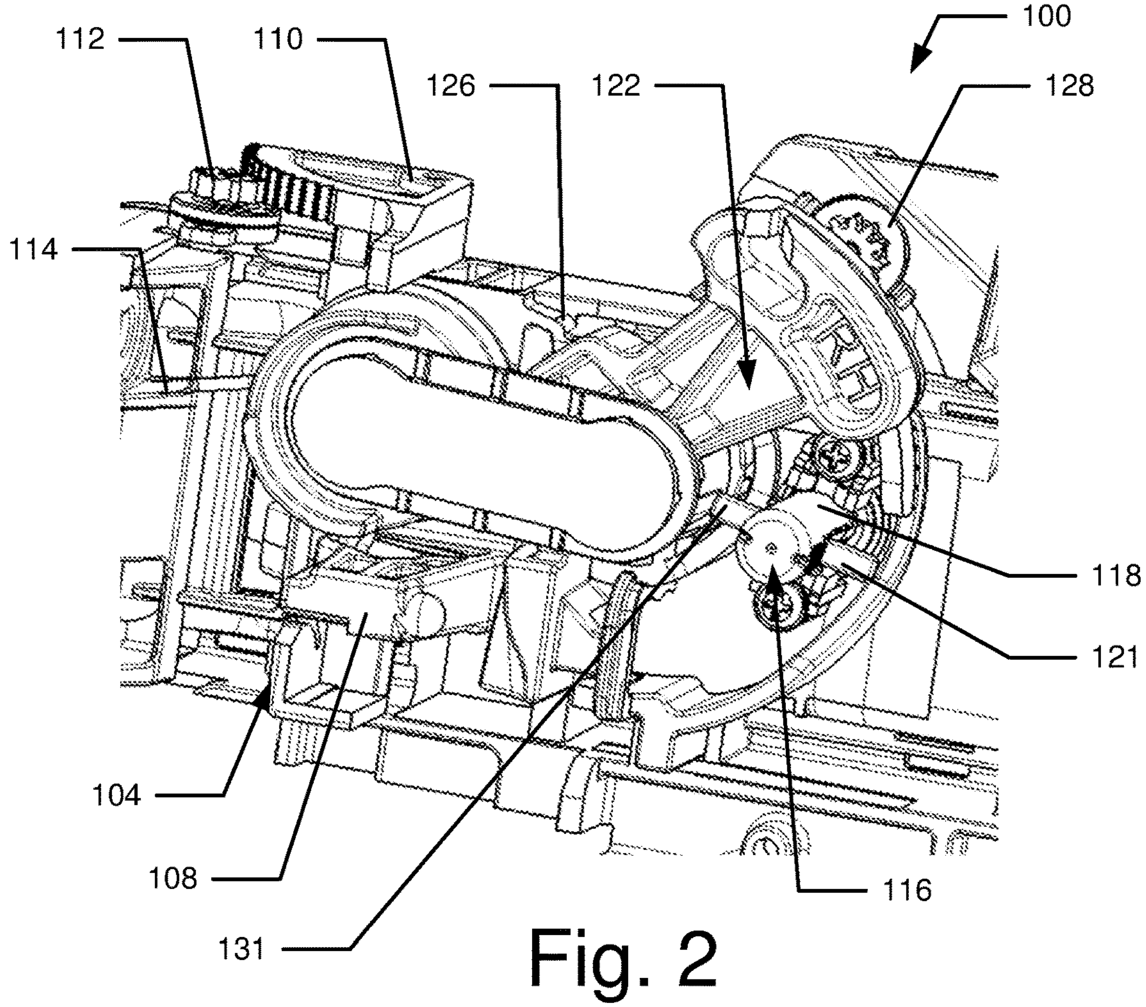
FIG. 2 illustrates a magnified view of the door handle assembly, according to example implementations of the present subject matter.

FIGS. 1A-1D illustrates different perspective views of a door handle assembly 100 in accordance with examples of the present subject matter. FIG. 1A illustrates a first perspective view of the door handle assembly 100, according to an example implementation of the present subject matter. FIG. 1B illustrates a second perspective view of the door handle assembly 100, according to an example implementation of the present subject matter. FIG. 1C illustrates a third perspective view of the door handle assembly 100, according to an example implementation of the present subject matter. FIG. 1D illustrates a fourth perspective view of the door handle assembly 100, according to an example implementation of the present subject matter. FIG. 2 illustrates a magnified view of a portion of the door handle assembly 100, according to example implementations of the present subject matter. For the sake of brevity and ease of understanding, FIGS. 1A-1D and FIG. 2 have been explained in conjunction with each other.

The door handle assembly 100 includes a frame 102 to be mounted to a door (not shown), such as of a vehicle. In an example, the frame 102 includes a housing portion (not shown) and an exterior surface having a cavity (not shown). The door handle assembly 100 includes a handle 104 disposed in the cavity of the frame 102. The handle 104 has a gripping portion 106 and a handle base 108. An operator of the door handle assembly 100 can grab the gripping portion 106 to move the handle 104 to lock/unlock or latch/unlatch the door. The handle 104 may be pivoted to the frame 102 by means of a pivot pin 110. Further, the pivot pin 110 is coupled with a damper pin 112. The damper pin 112 is adapted to restrict sudden movement of the pivot pin 110, and thus provides adequate tactile experience to the operator while operating the handle 104 of the door handle assembly 100.

In an example, the handle 104 is shaped to fit in the cavity of the frame 102 such that the handle 104 is flush with the exterior surface of the frame 102. Further, the handle 104 may be movable between a flush or an undeployed position to a deployed position with respect to the frame 102. For example, in the undeployed position, the handle 104 may be flush with the exterior surface of the frame 102 and in the deployed position, the handle 104 may protrude away from the cavity. Further, the door handle assembly 100 includes a first elastic member 114 by which the handle 104 is mounted to the frame 102. The first elastic member 114 is adapted to bias against the handle 104 such that the handle 104 can return back to the flush position from the deployed position when no external force is applied by the operator. In an example, the first elastic member 114 may be a torsional spring.

To move the handle 104 from the flush or undeployed position to the deployed position, the handle 104 is given a first actuation. For example, when the operator pushes or presses the gripping portion 106 of the handle 104, the handle 104 moves from the flush position to the deployed position. This may cause a portion of the handle 104 to protrude away from the cavity of the exterior surface of the frame 102 and the handle 104 may be considered in the deployed position. The operator may then pull the protruded portion of the handle 104 further away from the cavity to unlatch the door. The pulling action of the operator thereby results in opening the door. The action of pulling the protruded portion of the handle 104 further away from the cavity constitutes a second actuation and also unlatches the door. In response to the second actuation, the handle 104 is moved back to the flush position. In an example, the second actuation is provided in a direction opposite to the first actuation.

It is to be noted that although the foregoing description is provided with respect to a door, such as a vehicle door, the door handle assembly of the present subject matter may not be construed as limited to doors and may be implemented in vehicle interiors, liftgates or trunks of vehicles as well as in non-vehicle applications.

Further, the door handle assembly 100 includes a push-push assembly 116 operably coupled to the handle 104. In an example, the push-push assembly 116 is operably coupled to the gripping portion 106 of the handle 104. For instance, the push-push assembly 116 is in direct contact or directly coupled with the gripping portion 106 of the handle 104. The push-push assembly 116 may be fixedly attached to the frame 102 of the door handle assembly 100 using fasteners, such as a screw. The push-push assembly 116 includes a body 118, a control ring (not shown) and a compression spring (not shown) housed inside the body 118, and a pusher 120 operably coupled to the compression spring.

The pusher 120 is adapted to translate along a longitudinal axis of the body 118 of the push-push assembly 116. The control ring is adapted to regulate the movement of the pusher 120 in the body 118. In said example, the pusher 120 can include a primary profiled pathway cut-out on its external lateral surface and the control ring can have a follower which can cooperate with the primary profiled pathway on the pusher 120. Such a construction of the pusher 120 and the control ring for controlled movement of the pusher in various positions, such as holding the pusher 120 in the home position, the discharged position, and the recharged position (all explained in detail later) is based on the known constructions in the art. Further, the compression spring is adapted to provide bias to the pusher 120. According to the present subject matter, the push-push assembly 116 is positioned substantially orthogonal to the handle 104, when the handle 104 is in the flush or undeployed position. Due to the orthogonal positioning of the push-push assembly 116 with respect to the handle 104, flushness of the handle 104 with respect to the frame 102 of the door handle assembly 100 can be controlled by the push-push assembly 116.

Further, the actuation of the push-push assembly 116 governs the movement of the handle 104. For instance, when the push-push assembly 116 is in a recharged condition, the handle 104 is in the flush or undeployed position. In the recharged condition of the push-push assembly 116, the compression spring is in a compressed state, i.e., elastic potential energy is stored in the compression spring. Further, when the push-push assembly 116 is in a discharged condition, the handle 104 is in the deployed position. In the discharged condition of the push-push assembly 116, the compression spring is in a decompressed state, i.e., elastic potential energy is released from the compression spring.

The door handle assembly 100 further includes a bell crank 122 that is pivotably mounted to the frame 102 and is operably coupled to the handle 104 and is also in cooperative engagement with the push-push assembly 116. In an example, the handle base 108 is operably coupled to the bell crank 122. The bell crank 122 includes a primary profile 124 (shown in FIGS. 3-5) having a shape that assists in recharging the push-push assembly 116 from the discharged condition to the recharged condition. The pusher 120 of the push-push assembly 116 engages with the primary profile 124 formed on the bell crank 122 to recharge the push-push assembly 116. In an example, as shown in the figures, the pusher 120 may have an arm 121 which cooperated with the primary profile 124 and causes movement of the pusher 120 inside the body 118. However, the pusher 120 may cooperate with the primary profile 124 in other manners also such that the movement of the primary profile respective to the pusher 120 can cause translational motion of the pusher 120 similar to a relative motion between to a cam and its follower.

The primary profile 124 formed on the bell crank 122 may have a slanted shape. Further, the primary profile 124 is designed such that maximum height of the primary profile 124 is equal to the distance between a first extreme position of the pusher 120 and a second extreme position of the pusher 120. The bell crank 122 further includes a second elastic member 126 by which the bell crank 122 is pivotably mounted to the frame 102. The second elastic member 126 is adapted to move the bell crank 122 to its original or home position (i.e., position of the bell crank 122 when the handle is in the flush position) when the handle 104 is not actuated by the operator or when there is no external force applied on the handle. In an example, the second elastic member 126 may be a torsional spring. Further, the bell crank 122 includes a bell crank damper 128 adapted to restrict sudden movement of the bell crank 122. Thus, the bell crank damper 128 ensures a smooth operation of the bell crank 122.

FIGS. 1A-1D and FIG. 2 illustrate different perspective views of the door handle assembly 100 when the handle 104 is in the flush or undeployed position. Initially, the door may be in a locked condition and can be unlocked using any of the known methods, for example, using a remote keyless system or a mechanical key. When the door is unlocked, the handle 104 is in the flush position and the pusher 120 of the push-push assembly is positioned at a home position which falls between the two extreme positions of the pusher 120, i.e., the discharged position and the recharged position. In addition, the compression spring of the push-push assembly is in the compressed state when the handle 104 is in the flush or undeployed position. Further, the handle base 108 does not engage with the bell crank 122 when the handle 104 is in the flush or undeployed position. The operation of door handle assembly 100 when the handle 104 is moved from the flush position to the deployed position and vice-versa is explained in the following paragraphs.

Figure 3:
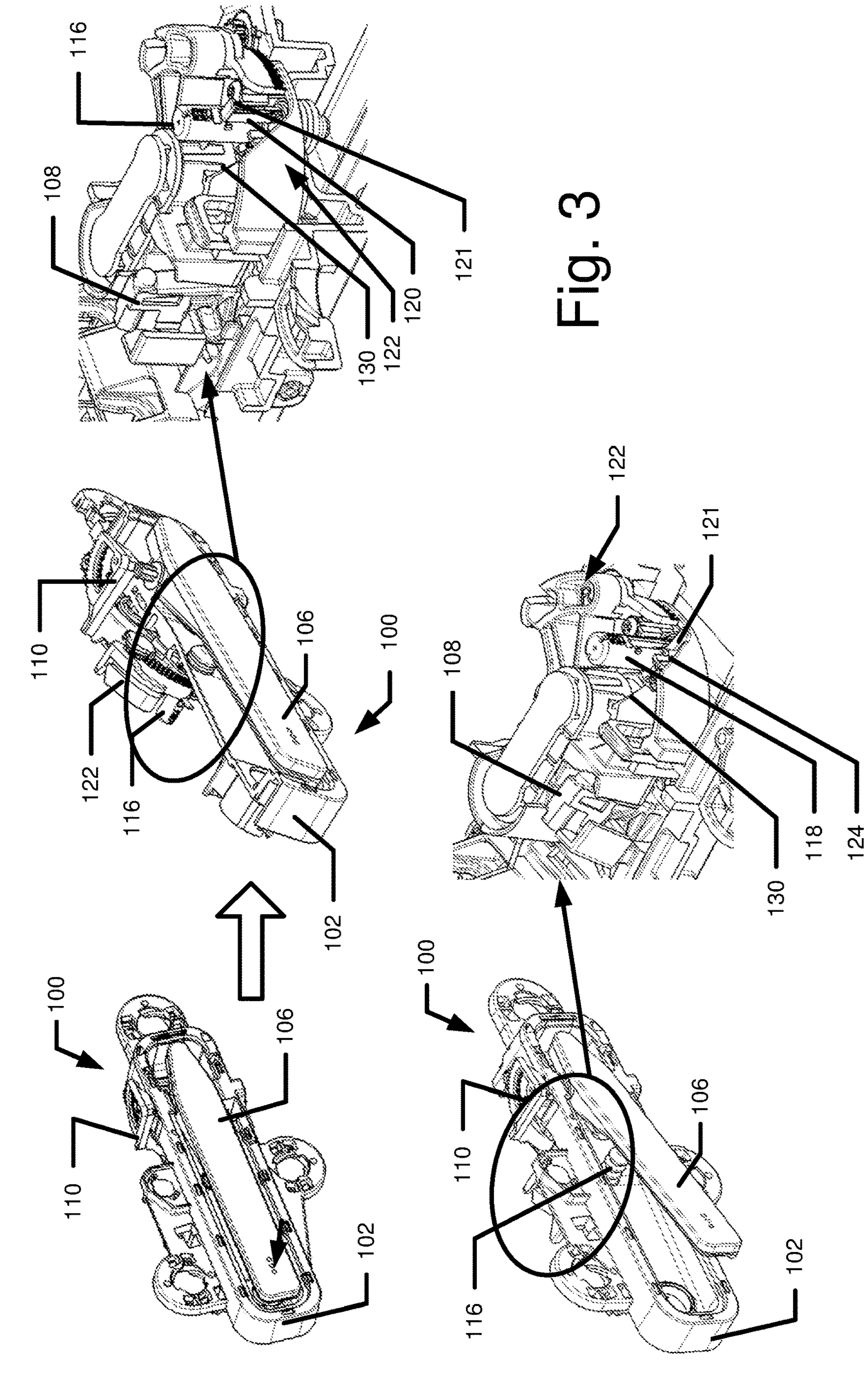
FIG. 3 is an illustration of sequential working of the door handle assembly when a handle is moved from a flush position to a deployed position, according to example implementations of the present subject matter.

FIG. 3 is a detailed illustration of working of the door handle assembly 100 when the handle 104 is moved from the flush position to the deployed position, according to an example implementation of the present subject matter. After the door is unlocked, the operator may provide a push to the handle 104 to activate the handle 104. In other words, the operator may press the handle 104 to activate it. When the handle 104 is pressed, the compression spring is further compressed. Further, the compression spring biases against the pusher 120 to move the pusher 120 inside the body 118. When the handle 104 is pressed, the pusher 120 first translates in a direction towards the frame 102 of the door handle assembly 100 to reach the first extreme position from the home position. Then, after reaching the first extreme position, the pusher 120 translates in a direction away from the frame 102 of the door handle assembly 100 to the second extreme position. When the pusher 120 reaches the first extreme position, the compression spring of the push-push assembly 116 starts decompressing. Further, when the pusher 120 translates from the first extreme position to the second extreme position, the compression spring decompresses and moves to the decompressed state. At the second extreme position, the pusher 120 rests at the surface of the bell crank 122. The pusher 120 is positioned at one end of the primary profile 124 formed on the bell crank 122.

The operator further actuates the handle 104 to move the handle 104 from the flush or undeployed position to the deployed position in order to unlatch the door. When the handle 104 is moved from the flush position to the deployed position, the handle base 108 rotates to make contact with the bell crank 122. Further, upon further actuation, the handle base 108 forces the bell crank 122 to rotate. When the bell crank 122 rotates, the pusher 120 undergoes relative motion with respect to the primary profile 124 of the bell crank 122. Due to the relative motion between the primary profile 124 and the pusher 120, the pusher 120 moves from one end of the primary profile 124 to another end. Due to relative movement of the pusher 120 between the two ends of the primary profile 124, the pusher 120 gains a height equal to the height of the primary profile 124. Since, the primary profile has a height equal to the distance between the first extreme position and the second extreme position of the pusher 120, the pusher 120 translates from the second extreme position to the first extreme position. The slanted shape of the primary profile 124 assists in relative motion between the pusher 120 and the primary profile 124 such that the pusher gains a height equal to the height of the primary profile 124. When the pusher 120 moves from the second extreme position to the first extreme position, the compression spring moves to compressed state from decompressed state and the push-push assembly 116 moves from the discharged condition to the charged condition.

Figure 4:
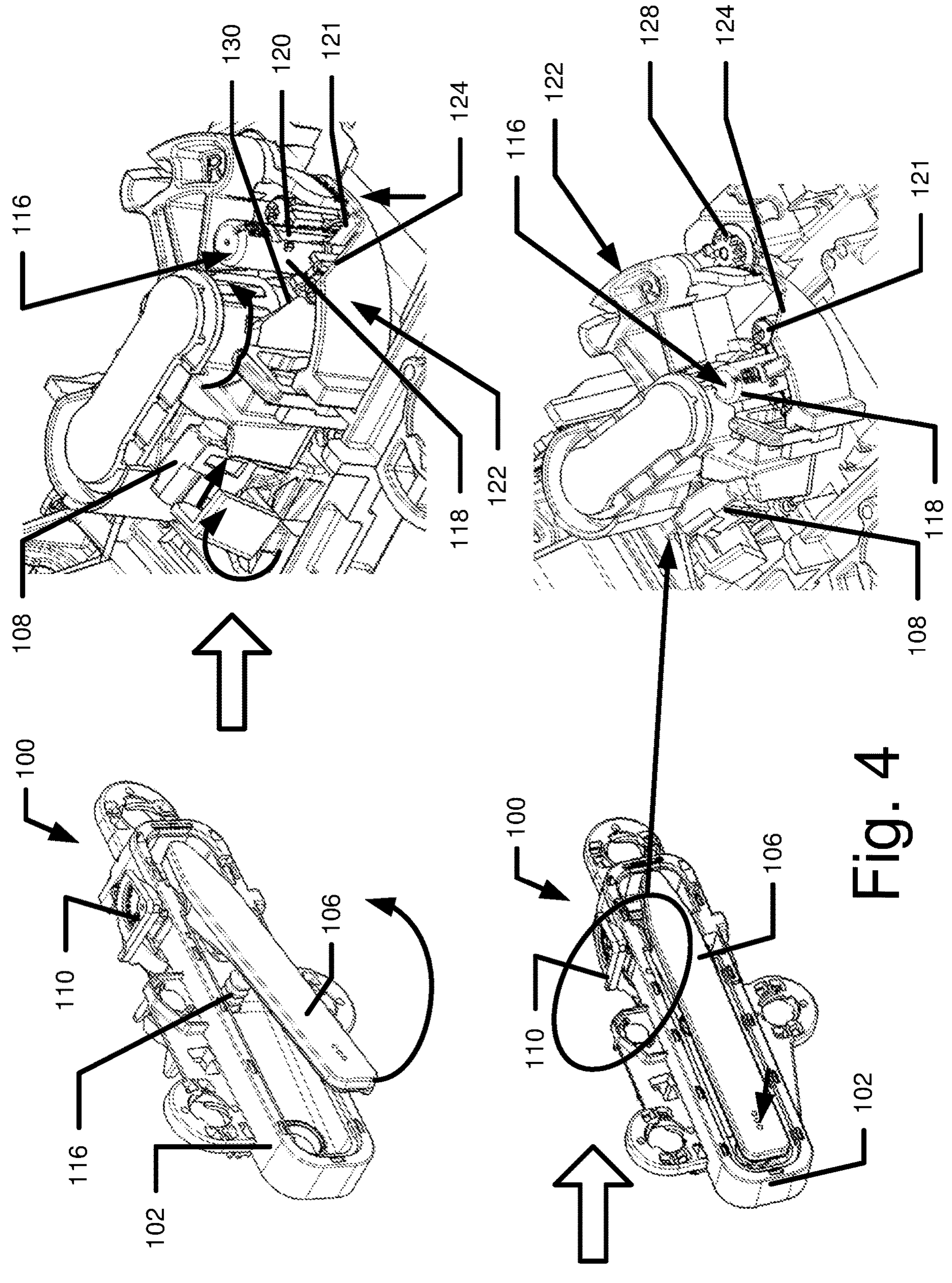
FIG. 4 is an illustration of sequential working of the door handle assembly when a handle is moved from the deployed position to the flush position, according to another example implementation of the present subject matter.

FIG. 4 is a detailed illustration of working of the door handle assembly 100 when the handle 104 is moved from the deployed position to the flush position, according to an example implementation of the present subject matter. When the door is unlatched, the handle 104 is released by the operator to move back to the flush or undeployed position. When the handle is released by the operator, the first elastic member 114 forces the handle base 108 to disengage with the bell crank 122. Therefore, the handle base 108 does not exert any force on the bell crank 122 when the handle 104 is released by the operator. In absence of any external force, the second elastic member 126 forces the bell crank 122 to rotate in opposite direction. When the bell crank 122 rotates in the opposite direction, the pusher 120 gets disengaged with the primary profile 124. When the pusher 120 is disengaged with the primary profile 124, the pusher 120 moves from the first extreme position to the home position. Accordingly, the handle 104 moves back to the flush position.

Therefore, according to the present subject matter, a separate actuator is not required to actuate or recharge the push-push assembly 116 when the push-push assembly 116 is in the discharged condition. Further, since the push-push assembly 116 can control the flushness of the handle 104 with respect to the frame 102 of the door handle assembly 100, a separate actuator is not necessary for controlling the flushness of the handle 104. Further, the push-push assembly 116 of the present subject matter has a simple design and requires significantly less space. Therefore, the door handle assembly 100 can also be used in a vehicle having space constraint. Further, the overall cost and weight of the door handle assembly 100 is significantly low due to small size of the push-push assembly and lesser number of components required to operate the door handle assembly 100.

In another implementation, the pusher 120 may have a plurality of arms, for example, two arms. In said implementation, the bell crank 122 may include a secondary profile 130 formed at its surface. The secondary profile 130 is formed away from the periphery of the bell crank 122, such that the pusher 120 is positioned between the primary profile 124 and the secondary profile 130. One of the arms, i.e., a first arm 121, of the pusher 120 of the push-push assembly engages with the primary profile 124 as explained in above paragraphs. Further, the second arm 131 of the pusher 120 extends towards the secondary profile 130 formed on the bell crank 122. Accordingly, the second arm 131 of the pusher 120 may engage with the secondary profile 130 similar to the engagement of the pusher 120 with the primary profile 124. Therefore, the secondary profile 130 also assists in recharging the push-push assembly 116 when the push-push assembly is in the discharged condition. In a situation, where one of the arms of the pusher 120 breaks down due to continuous operation, the push-push assembly need not be replaced since another arm of the pusher 120 can engage with one of the primary profile 124 or the secondary profile 130 to recharge the push-push assembly. Accordingly, the serviceability of the door handle assembly 100 is improved.

In an example, the secondary profile 130 has a different shape from that of the primary profile 124. For instance, the height of the secondary profile 130 may be similar to the height of the primary profile 124 but the slopes or the slants of the two may be designed differently with due regard to the difference in the distance of the two profiles from a pivoting centre of the bell crank 122. In other words, the shapes of the primary profile 124 and the secondary profile 130 can be differently slanted such that when the pusher 120 moves along the two, the motion of the two arms 121 and 131 of the pusher 120 along the two profiles 124 and 130 is synchronized.

Figure 5:
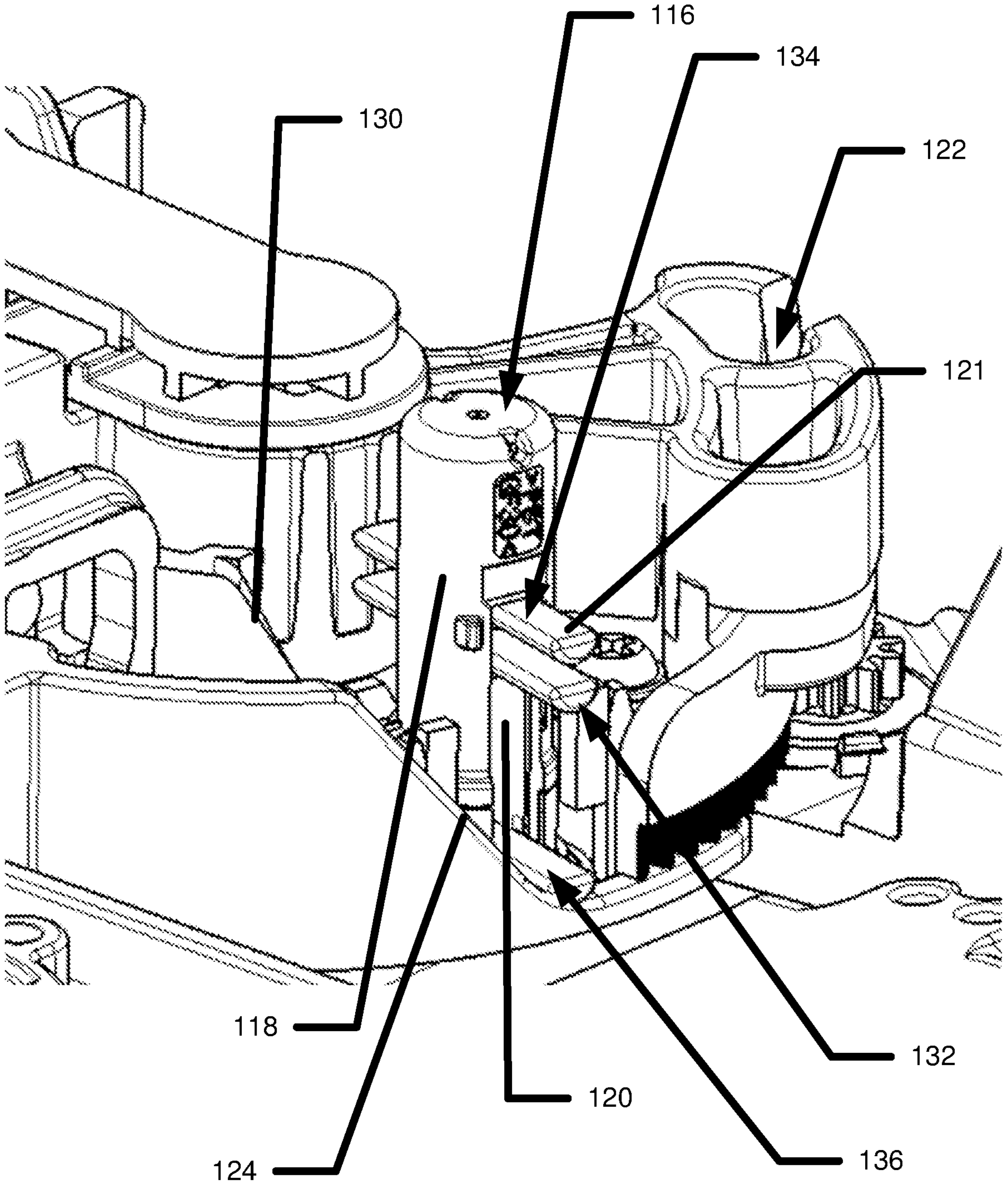
FIG. 5 illustrates different positions of a pusher of the door handle assembly in different stages of operation of the door handle assembly, according to example implementations of the present subject matter.

FIG. 5 illustrates different positions of the pusher 120 during operation of the door handle assembly 100, according to example implementations of the present subject matter. For instance, when the handle 104 is in the flush or undeployed position, the pusher 120 is at the home position which is illustrated by reference numeral 132. In other words, the reference numeral 132 illustrates that the pusher 120 is at the home position. Further, when the handle 104 is activated upon being pressed by the operator, the compression spring gets decompressed and the pusher 120 moves to the first extreme position which is illustrated by reference numeral 134. In other words, the reference numeral 134 illustrates that the pusher 120 is at the first extreme position. Moreover, when the operator further actuates the handle 104 by pulling action provided by the operator, the pusher 120 moves from the first extreme position to the second extreme position which is illustrated by reference numeral 136. In other words, the reference numeral 136 illustrates that the pusher 120 is at the second extreme position. Further, when the push-push assembly 116 is recharged due to engagement between the primary profile 124 and the pusher 120, the pusher 120 moves from the second extreme position to the first extreme position. Finally, when the operator releases the handle 104, the pusher 120 gets disengaged from the primary profile 124 and the pusher 120 moves from the first extreme position to the home position.

Although implementations of the door handle assembly 100 are described herein, it is to be understood that the present subject matter is not necessarily limited to the specific features of the systems or methods or other aspects described herein. Rather, these features are disclosed as implementations of the door handle assembly 100.

We claim:

1. A door handle assembly comprising:
- a frame mountable to a door, the frame comprising a housing portion and a cavity;
- a handle disposed in the cavity and pivotably coupled to the frame, wherein the handle is to be flush with the door in an undeployed position and is to protrude from the cavity in a deployed position;
- a push-push assembly comprising:
  - a body;
  - a compression spring housed inside the body; and
  - a pusher operably coupled to the compression spring to translate along a longitudinal axis of the push-push assembly,
    - wherein the push-push assembly is positioned with the longitudinal axis thereof substantially orthogonal to the handle; and
- a bell crank pivotably mounted to the frame, the bell crank being operably coupled to the handle and in cooperative coupling with the push-push assembly,
  - wherein the bell crank comprises a primary profile having a slanted shape engaged with the pusher of the push-push assembly to move the push-push assembly between a discharged condition and a recharged condition;
  - wherein the bell crank comprises a secondary profile having a slanted shape with a different slant than the primary profile; and
  - wherein a maximum height of the secondary profile is equal to a distance between a first extreme position of the pusher and a second extreme position of the pusher.

2. The door handle assembly as claimed in claim 1, wherein a maximum height of the primary profile is equal to a distance between the first extreme position of the pusher and the second extreme position of the pusher.

3. The door handle assembly as claimed in claim 2, wherein the first extreme position of the pusher corresponds to the undeployed position of the handle and the second extreme position of the pusher corresponds to the deployed position of the handle.

4. The door handle assembly as claimed in claim 1, wherein the bell crank is a single-piece component.

5. The door handle assembly as claimed in claim 1, wherein the pusher comprises a first arm to engage with the primary profile of the bell crank.

6. The door handle assembly as claimed in claim 5, wherein:
- the pusher comprises a second arm to engage with the secondary profile of the bell crank.

7. The door handle assembly as claimed in claim 1, wherein handle is coupled to the frame by a first elastic member adapted to bias the handle towards the undeployed position when no external force is applied on the handle.

8. The door handle assembly as claimed in claim 1, wherein the bell crank is pivotably mounted to the frame by a second elastic member adapted to move the bell crank to a home position when no external force is applied on the handle.

9. The door handle assembly as claimed in claim 1, wherein the pusher comprises an arm to engage with the secondary profile of the bell crank.

10. The door handle assembly as claimed in claim 1, wherein the secondary profile has a height less than or equal to a height of the primary profile.

11. The door handle assembly as claimed in claim 1, wherein the longitudinal axis of the push-push assembly is substantially orthogonal to a length of the handle.

12. The door handle assembly as claimed in claim 1, wherein:

the handle comprises an exterior surface that is to be flush with the door when the handle is in the undeployed position; and the push-push assembly is positioned with the longitudinal axis thereof extending toward the exterior surface of the handle.

13. The door handle assembly as claimed in claim 1, wherein:

the handle comprises an exterior surface that is to be flush with the door when the handle is in the undeployed position;

the push-push assembly comprises only one compression spring; and when the bell crank moves the push-push assembly from the charged condition to the discharged condition, the compression spring decompresses towards the exterior surface of the handle.

14. The door handle assembly as claimed in claim 1, wherein:

when the push-push assembly is in the recharged position, the handle is in the undeployed position;

when the push-push assembly is in the discharged position, the handle is in the deployed position;

the bell crank is configured to move the push-push assembly from the recharged condition to the discharged condition when an operator presses the handle; and the bell crank is configured to move the push-push assembly from the discharged condition back to the recharged condition when the operator releases the handle.

* * * * *